US012803452B2

(12) United States Patent
Huang et al.

(10) Patent No.: US 12,803,452 B2
(45) Date of Patent: Nov. 17, 2026

(54) LLC CONVERTERS AND CONTROL METHODS THEREOF

(71) Applicant: Leadtrend Technology Corporation, Zhubei City (TW)

(72) Inventors: Jun-Hao Huang, Zhubei City (TW); Tsung-Chien Wu, Zhubei City (TW); Ming-Chang Tsou, Zhubei City (TW); Chun-Hsin Li, Zhubei City (TW)

(73) Assignee: LEADTREND TECHNOLOGY CORPORATION, Zhubei City (TW)

( * ) Notice: Subject to any disclaimer, the term of this patent is extended or adjusted under 35 U.S.C. 154(b) by 218 days.

(21) Appl. No.: 18/976,586

(22) Filed: Dec. 11, 2024

(65) Prior Publication Data

US 2026/0025078 A1 Jan. 22, 2026

(30) Foreign Application Priority Data

Jul. 19, 2024 (TW) ................................ 113127221

(51) Int. Cl.
*H02M 3/335* (2006.01)
*H02M 1/00* (2006.01)
*H02M 3/00* (2006.01)

(52) U.S. Cl.
CPC ..... *H02M 3/33592* (2013.01); *H02M 1/0048* (2021.05); *H02M 1/0095* (2021.05); *H02M 3/01* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 3/33573; Y02B 70/1491
See application file for complete search history.

(56) References Cited

U.S. PATENT DOCUMENTS

| | | | | |
|---|---|---|---|---|
| 9,991,809 | B2 * | 6/2018 | Kikuchi | H02M 3/33592 |
| 11,290,002 | B2 * | 3/2022 | Ke | H02M 1/36 |
| 2018/0226897 | A1 * | 8/2018 | Kong | H02M 3/33592 |

* cited by examiner

*Primary Examiner* — Jeffrey A Gblende
(74) *Attorney, Agent, or Firm* — McClure, Qualey & Rodack, LLP

(57) ABSTRACT

An LLC converter includes an LLC resonant tank, a first synchronous rectifier and a synchronous rectification controller. The LLC resonant tank includes a primary winding of a transformer including a first secondary winding. The first synchronous rectifier is connected in series with the first secondary winding through a first detection node and between an output power line and an output ground line. The synchronous rectification controller draws current from the first detection node and to raise an operation power source on a filter capacitor supplying power to the synchronous rectification controller.

20 Claims, 5 Drawing Sheets

LLC CONVERTERS AND CONTROL METHODS THEREOF

CROSS-REFERENCE TO RELATED APPLICATION

This application claims priority to and the benefit of Taiwan Application Series Number 113127221 filed on Jul. 19, 2024, which is incorporated by reference in its entirety.

BACKGROUND

The present disclosure relates generally to LLC converters with synchronous rectification, and more particularly to LCC converters and control methods that generate an operation power source for a synchronous rectification controller controlling a synchronous rectifier.

LLC converters are one type of resonant converters, which typically provides a stable output voltage, high conversion efficiency, and high output power. Generally, a resonant converter converts a DC input power source into a sinusoidal signal, and this conversion can be achieved through a switch network that supplies a square-wave voltage to a resonant tank. After filtering through the resonant tank, the fundamental component of the square-wave voltage is predominantly retained, roughly producing a sinusoidal input current. Due to the inductive effects, an AC current is generated on the secondary side of the LLC converter, and, after rectification, it can be used to establish an output power source.

LLC converters are typically used for high-current efficiency, outputs. To improve conversion synchronous rectification can be employed on the secondary side of an LLC converter. This involves replacing the traditionally-used rectifier diode with a power switch and a synchronous rectification controller controlling the power switch. The power switch is normally named a synchronous rectifier. Doing so can reduce or eliminate the significant power loss caused by the forward voltage of the rectifier diode when conducting large currents.

Although synchronous rectification may improve conversion efficiency, it can also introduce issues that require special handling.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, logic circuit, or other suitable components that provide the described functionality. In addition, it is appreciated that the figures provided herewith are for explanation purposes to persons ordinarily skilled in the art and that the drawings are not necessarily drawn to scale.

Figure 1:
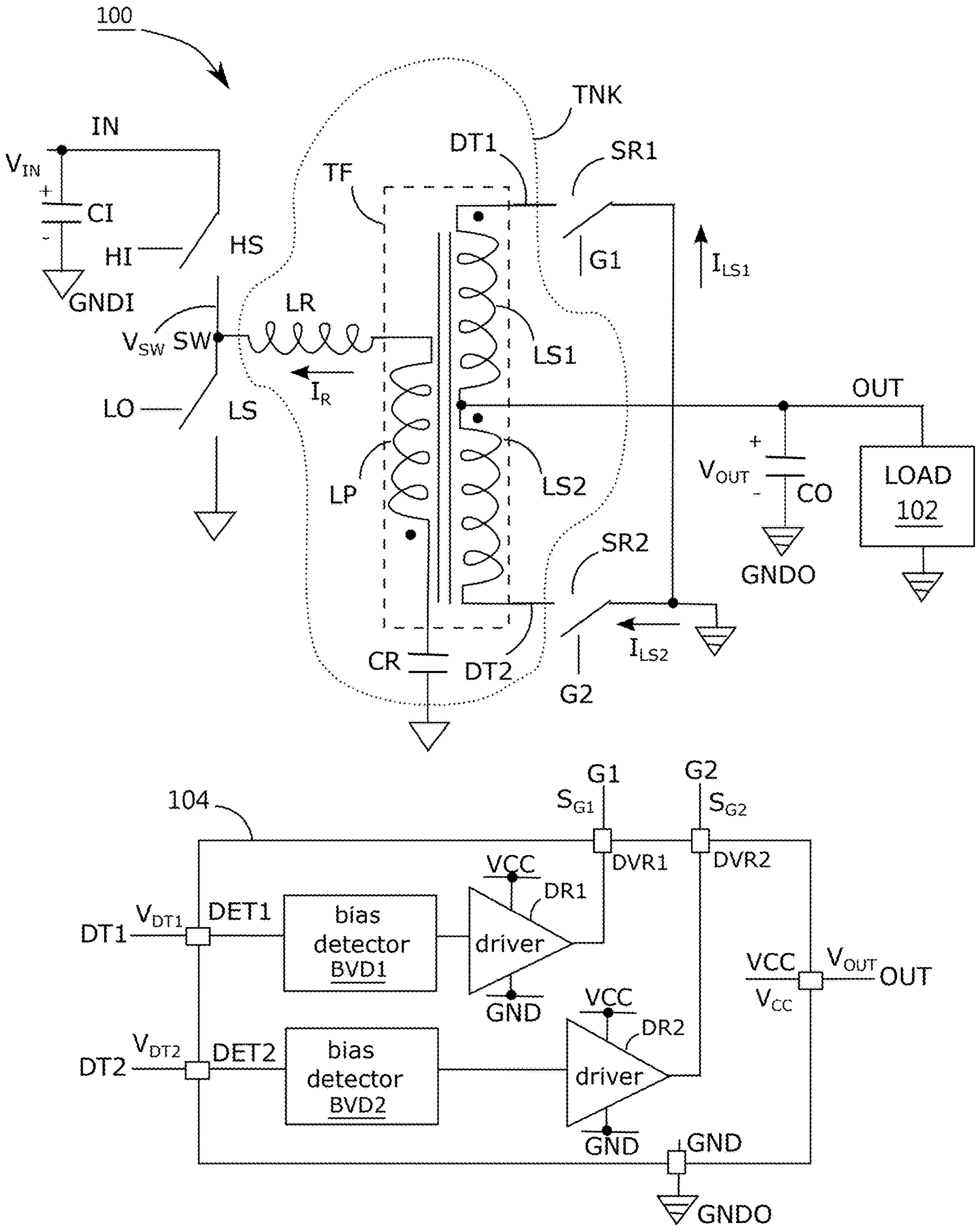
FIG. 1 illustrates an LLC converter.

FIG. 1 illustrates LLC converter 100, used to convert input power source VIN on the primary side into output power source $V_{OUT}$ on the secondary side. LLC converter 100 employs synchronous rectification, using two synchronous rectifiers, SR1 and SR2, to rectify inductor currents $I_{LS1}$ and $I_{LS2}$ respectively, output by two secondary windings LS1 and LS2.

On the primary side, high-side switch HS and low-side switch LS are connected in series through input node SW and between input power line IN and input ground line GNDI, forming a half-bridge structure that can be regarded as a square-wave generator. Input capacitor CI, acting as a filter capacitor connected between input power line IN and input ground line GNDI, stabilizes the voltage of input power source VIN. High-side switch HS and low-side switch LS are controlled by high-side control signal HI and low-side control signal LO, respectively.

Resonant inductor LR, primary winding LP of transformer TF, and resonant capacitor CR are connected in series between input node SW and input ground line GNDI, forming LLC resonant tank TNK. In one embodiment, resonant inductor LR may not be a discrete component but instead the leakage inductance of primary winding LP that is not magnetically coupled with secondary windings LS1 and LS2.

High-side switch HS and low-side switch LS are alternately turned on, providing a square-wave voltage to input node SW, causing LLC resonant tank TNK to resonate. An alternating current H s generated on resonant inductor LR. Through the inductively coupling of transformer TF, corresponding inductor currents $I_{LS1}$ and $I_{LS2}$ are generated on secondary windings LS1 and LS2, respectively. Synchronous rectifiers and SR2, two power switches, provide full-wave rectification to inductor currents $I_{LS1}$ and ILSE where synchronous rectifiers SR1 is between output ground line GNDO and detection node DT1, and synchronous rectifiers SR2 between output ground line GNDO and detection node DT2. Filter capacitor co provides low-pass filtering to generate output power source $V_{OUT}$ between output power line OUT and output ground line GNDO. Output power source $V_{OUT}$ supplies power to load 102.

Figure 2:
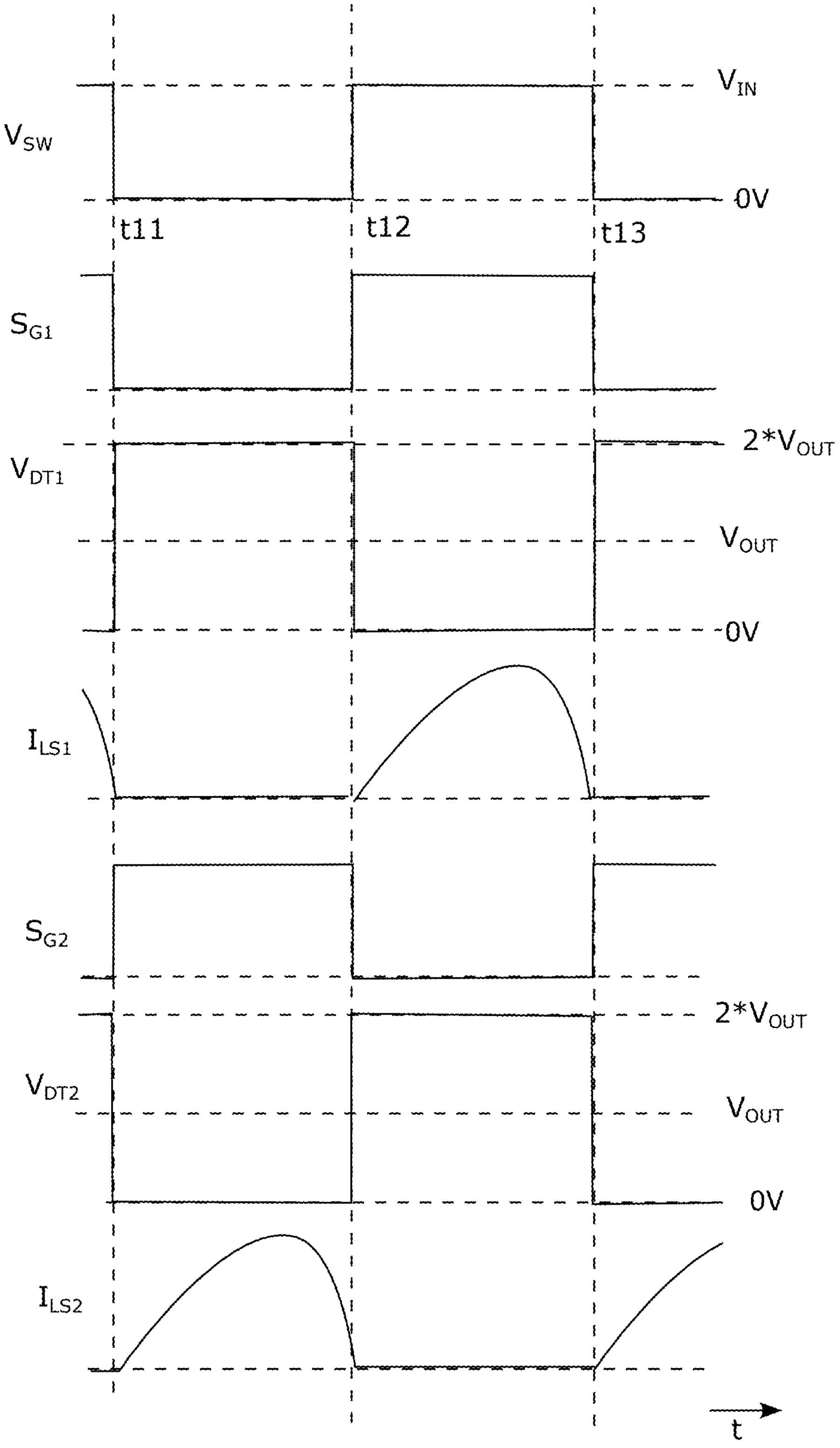
FIG. 2 demonstrates the waveforms of some signals in FIG. 1.

In FIG. 1, output power source $V_{OUT}$ also serves as operation power source $V_{CC}$ supplying power to synchronous rectification controller 104 for proper operation. Synchronous rectification controller 104 generates control signals $S_{G1}$ and $S_{G2}$ to control synchronous rectifiers SR1 and SR2, respectively, based on detected voltages $V_{DT1}$ and $V_{DT2}$ at detection nodes DT1 and DT2. For example, in response to detected voltage $V_{DT1}$, bias detector BVD1 might activate driver DR1, which generates control signal $S_{G1}$ with suitable voltage levels to drive synchronous rectifier SR1. FIG. 2 demonstrates from top to bottom the waveforms of square-wave voltage $V_{SW}$, control signal $S_{G1}$, detected voltage $V_{DT1}$, inductor current $I_{LS1}$, control signal $S_{G2}$, detected voltage $V_{DT2}$, and inductor current $I_{LS2}$. The period from moment t11 to moment t12 represents one half switching cycle, and the period from moment t12 to moment t13 represents the next half switching cycle.

Take the half switching cycle from moment t11 to moment t12 as an example. At around moment t11, detected voltage $V_{DT2}$ drops as it inductively senses the falling of the voltage across primary winding LP. When detected voltage $V_{DT2}$ becomes negative, synchronous rectification controller 104 sets control signal $S_{G2}$ to logic "1," turning ON synchronous rectifier SR2. This action clamps detected voltage $V_{DT2}$ at approximately 0V. During this half switching cycle, inductor current $I_{LS2}$ oscillates as LLC resonant tank TNK resonates, increasing after moment t11 and then decreasing before moment t12.

Simultaneously, around moment t11, due to inductive coupling, detected voltage $V_{DT2}$ starts rising from a value slightly below 0V. When detected voltage $V_{DT1}$ becomes positive, synchronous rectification controller 104 sets control signal $S_{G1}$ to logic "0," turning OFF synchronous rectifier SR1. As a result, inductor current $I_{LS1}$ stabilizes around OA and detected voltage $V_{DT1}$ continues rising, eventually stabilizing at approximately twice output power source $V_{OUT}$, as shown in FIG. 2.

The waveforms for the next half switching cycle, from moment t12 to moment t13, are not detailed here because they can be understood based on the explanation of the first half switching cycle.

The waveforms in FIG. 2 are generated in a condition when output power source $V_{OUT}$ has stabilized at target voltage $V_{TAR}$, 5V for instance. However, during the startup sequence as output power source $V_{OUT}$ rises from 0V to target voltage $V_{TAR}$, coupling capacitive may cause synchronous rectifiers SR1 and SR2 to provide leakage paths when they should be turned OFF. In the worst-case scenario, this leakage could prevent output power source $V_{OUT}$ from reaching target voltage $V_{TAR}$.

Figure 3:
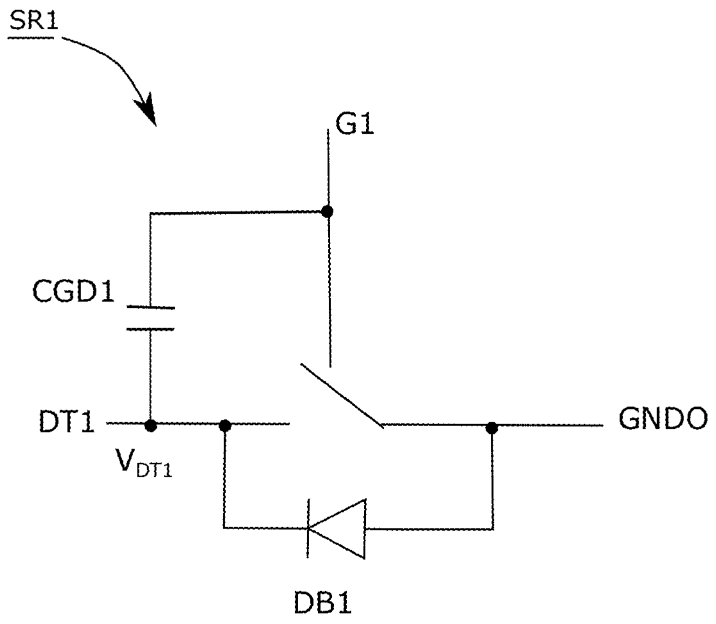
FIG. 3 demonstrates a synchronous rectifier along with parasitic components.

FIG. 3 demonstrates synchronous rectifier SR1 along with parasitic components, including drain-to-gate capacitor CGD1 connected between control node G1 and detection node DT1, and body diode DB1 between output ground line GNDO and detection node DT1. When output power source $V_{OUT}$ is insufficiently high, synchronous rectification controller 104 in FIG. 1 lacks an adequate operation power source $V_{CC}$, rendering it unable to properly turn ON or OFF synchronous rectifiers SR1 and SR2. Theoretically, synchronous rectifier SR1 remains OFF when operation power source $V_{CC}$ is absent or insufficient, with body diode DB1 providing the necessary rectification for building up output power source $V_{OUT}$. In such cases, both control signals SG1 and SG2 should remain firmly at logic "0".

However, as shown in FIG. 2, detected voltage $V_{DT1}$ has a rising edge at around moment t11. Due to capacitive coupling through drain-to-gate capacitor CGD1, this rising edge might slightly pull up the voltage at control node G1, potentially causing synchronous rectifier SR1 to conduct or leak when it should remain OFF after moment t11. Consequently, LLC converter 100 might require excessive time to bring output power source $V_{OUT}$ to target voltage $V_{TAR}$, or output power source $V_{OUT}$ might fail to reach target voltage $V_{TAR}$ entirely.

Figure 4:
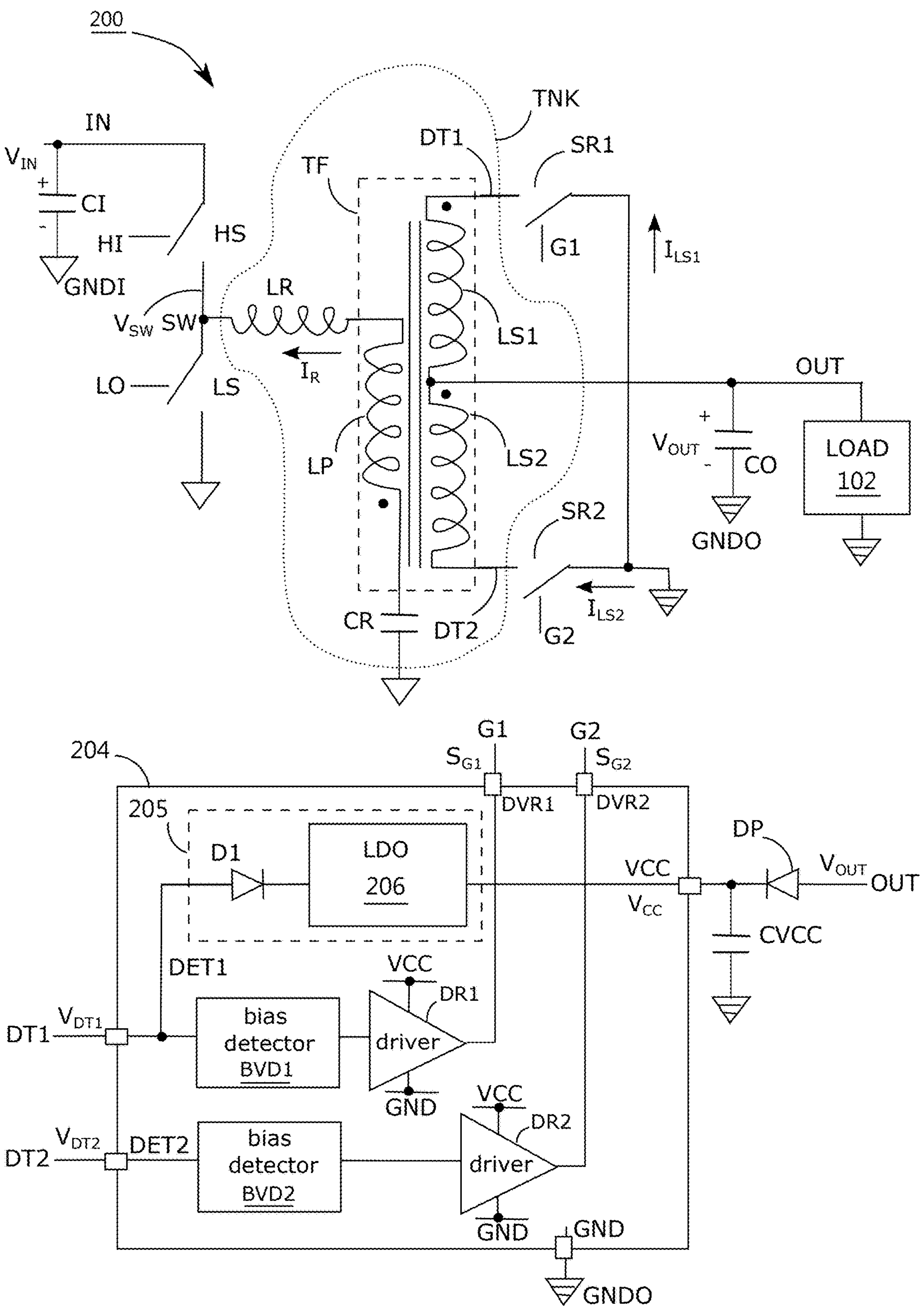
FIG. 4 shows an LLC converter according to embodiments of the invention.

FIG. 4 shows LLC converter 200 according to embodiments of the invention, to convert input power source VIN on the primary side into output power source $V_{OUT}$ on the secondary side. Similar or identical features between LLC converter 200 and LLC converter 100 are covered in the prior description and might not be repetitively detailed. Compared to LLC converter 100 in FIG. 1, LLC converter 200 in FIG. 4 additionally includes rectifier diode DP and filter capacitor CVCC, which provides operation power source $V_{CC}$. Additionally, synchronous rectification controller 204 includes power regulator 205 with rectifier diode D1 and linear dropout 206, not presented in synchronous rectification controller 104 in FIG. 1.

Operation power source $V_{CC}$ supplies power to synchronous rectification controller 204. It can be generated from the current of output power source $V_{OUT}$ through rectifier diode DP or from the current drawn by power regulator 205 from detection node DT1.

In one embodiment, linear dropout 206 is configured to draw current from detection node DT1 and to raise operation power source $V_{CC}$ to 4.5V. Once operation power source $V_{CC}$ exceeds 4.5V, synchronous rectification controller 204 can properly control synchronous rectifiers SR1 and SR2, and linear dropout 206 stops drawing current for detection node DT1. In a startup sequence, as output power source $V_{OUT}$ increases to reach approximately 2.25V, detected voltage $V_{DT1}$ at detection node DT1 will be about 4.5V during the half switching cycle from moment t11 to moment t12 in FIG. 2. Consequently, linear dropout 206 and rectifier diode D1 work together to draw current from detection node DT1, charging filter capacitor CVCC and raising operation power source $V_{CC}$ to 4.5V, enabling synchronous rectification controller 204 to operate synchronous rectifiers SR1 and SR2 properly.

Assuming target voltage $V_{TAR}$ for output power source $V_{OUT}$ is 5V, once LLC converter 200 regulates output power source $V_{OUT}$ to 5V, operation power source $V_{CC}$ will be maintained at approximately 5V by the current from output power source $V_{OUT}$ through rectifier diode DP. At this stage, linear dropout 206 ceases drawing current from detection node DT1, eliminating any power loss.

During the startup sequence, LLC converter 200 in FIG. 4 operates synchronous rectifiers SR1 and SR2 earlier than LLC converter 100 in FIG. 1. As previously mentioned, synchronous rectification controller 204 in FIG. 4 begins operating properly once output power source $V_{OUT}$ exceeds 2.25V, because operation power source $V_{CC}$ will be ready at approximately 4.5V. In contrast, based on the teaching of FIG. 1, output power source $V_{OUT}$ in FIG. 1 must teach 4.5V at least, so operation power source $V_{CC}$ is 4.5V at least to activate synchronous rectification controller 204, which accordingly works properly. Therefore, LLC converter 200 in FIG. 4 allows synchronous rectifiers SR1 and SR2 to operate earlier in the startup sequence, resulting in a smoother and more stable startup sequence.

Figure 5:
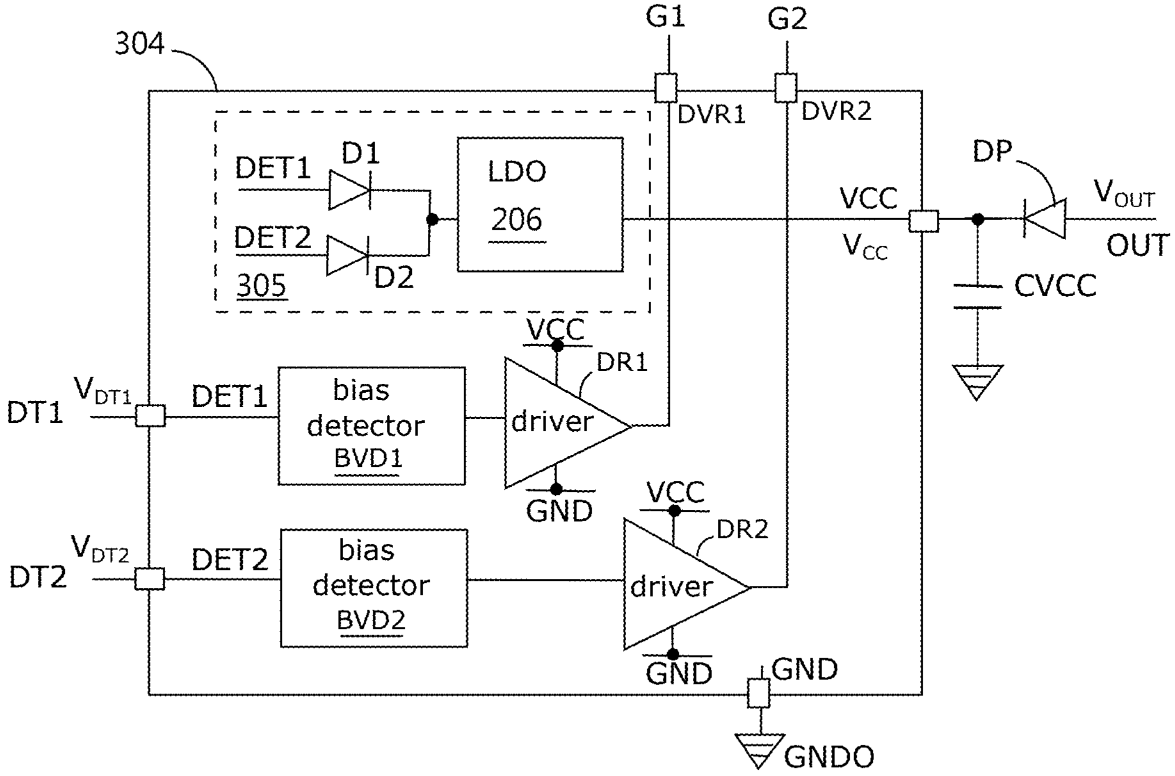
FIG. 5 illustrates a synchronous rectification controller.

FIG. 5 illustrates synchronous rectification controller 304, which replaces synchronous rectification controller 204 in FIG. 4 according to an embodiment of the invention. Compared to power regulator 205 in FIG. 4, power regulator 305 additionally includes rectifier diode D2 connected between linear dropout 206 and detection node DT2, as shown in FIG. 5.

To establish operation power source $V_{CC}$, synchronous rectification controller 304 draws current not only from detection node DT1 during the first half switching cycle from moment t11 to moment t12, but also from detection node DT2 during the next half switching cycle from moment t12 to moment t13.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LLC converter, comprising;

a square-wave generator with two power switches connected in series through an input node and between an input power line and an input ground line, for providing a square-wave voltage to the input node;

an LLC resonant tank connected to the input node, including a primary winding of a transformer and a resonant capacitor connected in series, wherein the transformer includes a first secondary winding;

a first synchronous rectifier with a first detection node for connecting the first secondary winding and an output ground line, wherein the first secondary winding is connected between an output power line and the first detection node;

a filter capacitor for providing an operation power source; and a synchronous rectification controller for controlling the first synchronous rectifier in response to a first detected voltage at the first detection node, comprising a power regulator configured to draw current from the first detection node and to establish the operation power source supplying power to the synchronous rectification controller.

2. The LLC converter of claim 1, wherein the transformer includes a second secondary winding, the LLC converter further comprises a second synchronous rectifier with a second detection node for connecting the second secondary winding and the output ground line, the second secondary winding is connected between the output power line and the second detection node, and the synchronous rectification controller controls the second synchronous rectifier in response to a second detected voltage at the second detection node.

3. The LLC converter of claim 2, wherein the power regulator is configured to draw current from the second detection node for establishing the operation power source.

4. The LLC converter of claim 2, wherein the power regulator comprises a linear dropout.

5. The LLC converter of claim 4, wherein the power regulator comprises a first diode connected between the linear dropout and the first detection node, and a second diode connected between the linear dropout and the second detection node.

6. The LLC converter of claim 1, further comprising a rectifier diode connected between the output power line and the filter capacitor.

7. The LLC converter of claim 1, wherein the power regulator stops drawing current from the first detection node when the operation voltage source exceeds a first predetermined voltage.

8. The LLC converter of claim 7, wherein the LLC converter regulates an output power source on the output power line to a target voltage higher than the first predetermined voltage.

9. The LLC converter of claim 1, wherein the square-wave generator has a half-bridge structure.

10. A control method in use of an LLC converter, comprising:

providing a square-wave voltage to an input node of a LLC resonant tank comprising a resonant capacitor and a primary winding of a transformer, wherein the transformer includes a first secondary winding connected in series with a first synchronous rectifier through a first detection node and between an output power line and an output ground line;

providing a synchronous rectification controller controlling the first synchronous rectifier in response to a first detected voltage at the first detection node;

drawing current from the first detection node to charge a filter capacitor and to raise an operation power source supplying power to the synchronous rectification controller.

11. The control method of claim 10, wherein the transformer includes a second secondary winding connected in series with a second synchronous rectifier through a second detection node and between the output power line and the output ground line, and the synchronous rectification controller controls the second synchronous rectifier in response to a second detected voltage at the second detection node.

12. The control method of claim 11, wherein the synchronous rectification controller draws a first current from the first detection node to charge the filter capacitor during a first period, and a second current from the second detection node to charge the filter capacitor during a second period different from the first period.

13. The control method of claim 10, further comprising:

regulating an output power source on the output power line to a target voltage;

wherein the synchronous rectification controller draws the current to raise the operation power source up to a first reference voltage less than the target voltage, and stops drawing the current when the operation power source exceeds the first reference voltage.

14. An LLC converter, comprising:

an LLC resonant tank with a resonant capacitor and a primary winding of a transformer connected in series between an input node and a power line, wherein the transformer includes a first secondary winding;

a first synchronous rectifier connected in series with the first secondary winding through a first detection node between an output power line and an output ground line;

a synchronous rectification controller controlling the first synchronous rectifier in response to a first detected voltage at the first detection node, comprising:

a power regulator drawing current from the first detection node and to raise an operation power source on a filter capacitor supplying power to the synchronous rectification controller.

15. The LCC converter of claim 14, wherein the power regulator comprises a diode and a linear dropout connected in series between the filter capacitor and the detection node, and the linear dropout stops drawing the current when the operation voltage source exceeds a first predetermined voltage.

16. The LCC converter of claim 15, wherein the LCC converter is configured to regulate an output power source on the output power line to a target voltage higher than the first predetermined voltage.

17. The LCC converter of claim 16, further comprising:

a rectifier diode connected between the output power line and the filter capacitor.

18. The LCC converter of claim 14, wherein the transformer further includes a second secondary winding connected in series with a second synchronous rectifier through a second detection node and between the output power line and the output ground line.

19. The LCC converter of claim 18, wherein the power regulator draws a first current from the first detection node to raise the operation power source during a first period, and a second current from the second detection node to raise the operation power source during a second period different from the first period.

20. The LCC converter of claim 19, wherein the power regulator comprises a first rectifier diode, a second rectifier diode and a linear dropout, the first and second rectifier diode are connected to the first and second detection nodes respectively, and the linear dropout is connected to both the first and second rectifier diodes for raising the operation power source up to a first reference voltage.

* * * * *